UNITED STATES PATENT OFFICE.

WILLIAM D. PATTEN, OF NEW YORK, N. Y.

FIREPROOFING COMPOUND.

No. 802,311.　　Specification of Letters Patent.　　Patented Oct. 17, 1905.

Application filed June 15, 1904. Serial No. 212,679.

*To all whom it may concern:*

Be it known that I, WILLIAM D. PATTEN, a citizen of the United States, and a resident of the city, county, and State of New York, have invented a certain new and useful Improvement in Fireproofing Compounds, of which the following is a specification.

My invention relates to fireproofing compounds of that class involving the use of chemicals which fuse at a temperature below the point of wood ignition, thereby inclosing and protecting from flame the fibers of the treated substance. The chemicals possessing this quality which have been heretofore generally used are phosphate of ammonium and sulfate of ammonium. These have generally been applied by impregnating the substance to be treated with a solution containing about twenty per cent. of these salts mixed together in varying proportions, varying from two to five parts of sulfate to one part of phosphate. The chief objection to the chemicals stated is that they volatilize readily at a temperature slightly above the point of fusion, so that they are not effective if in the presence of fire for a substantial length of time.

The object of my invention is to overcome the objection stated and to produce a fireproofing compound which, while it will fuse at a temperature below the point of wood ignition, will also maintain its fluidity and not volatilize appreciably in the continued presence of fire.

I have discovered that dihydrogen sodium phosphate, either the pyro salt $H_2Na_2P_2O_7$ or the ortho salt $H_2NaPO_4$, while it does not of itself fuse below the point of wood ignition, if treated with a substantial percentage of sulfate of ammonium fuses readily at a temperature below the point of wood ignition, the fused mass being a free fluid and less volatile under fire conditions than any of the compounds heretofore used. The following experiment shows the relative value of my new fireproofing compound to phosphate of ammonium. Two mixtures were prepared, one containing 66.66 per cent. of phosphate of ammonium and 33.33 per cent. of sulfate of ammonium and the other 66.66 per cent. of dihydrogen sodium ortho phosphate and 33.33 per cent. of sulfate of ammonium. Equal quantities of blotting-paper were saturated with these two solutions, respectively, were dried, ignited at a dull red heat for fifteen, thirty, forty-five, and seventy-five minutes, and weighed. By analysis the non-volatile residue was determined, and in the following table the non-volatile residue equals the percentage remaining of the dry salts used:

|  | Sol. ammonium phosphate. | Sol. dihydrogen sodium ortho phosphate. |
|---|---|---|
| 15 minutes exposure | 40 per cent. | 63.80 per cent. |
| 30 minutes exposure | 16.30 per cent. | 59.50 per cent. |
| 45 minutes exposure | 5 per cent. | 59.20 per cent. |
| 75 minutes exposure | 4.50 per cent. | 58 per cent. |

In the practical application of my invention I substitute for each part of phosphate of ammonium as now used a mixture comprising two-thirds parts of dihydrogen sodium ortho phosphate and one-third part of sulfate of ammonium. For instance, if the solution contained a twenty-per-cent. mixture of phosphate of ammonium and sulfate of ammonium in the proportion of one pound of phosphate of ammonium to two pounds of sulfate of ammonium I would substitute for the one pound of phosphate of ammonium a mixture comprising two-thirds of a pound of dihydrogen sodium ortho phosphate and one-third of a pound of sulfate of ammonium, the substitution of the two-thirds parts of dihydrogen sodium ortho phosphate and the one-third part of the sulfate of ammonium for the one part of phosphate of ammonium being in addition to the two parts of sulfate of ammonium originally in the twenty-per-cent. mixture.

My experiments show that the explanation of the valuable results occurring from the use of dihydrogen sodium phosphate, as described, is that the sulfate of ammonium reacts on the dihydrogen sodium phosphate, freeing ammonia-gas and leaving either a mixture or an undetermined chemical combination of meta or pyro phosphate of soda and meta or pyro phosphoric acid together with sulfate of soda dissolved therein, which said mixture has the properties stated of free fluidity in a state of fusion at a temperature below the point of wood ignition, but does not readily volatilize. The essential for reaching the result is that part or all of the sodium base should be extracted from the dihydrogen sodium phosphate by any suitable chemical under the action of heat at a temperature below the ignition-point of wood, as illustrated by the following formula, $(Na_2O-XNa_2O)P_2O_5$, the value of X being one or less, but if less than one still of sufficient value so that the resultant mixture or chemical combination of meta or pyro phosphate of soda and meta or pyro phosphoric acid shall fuse and be freely fluid at a temperature below the ignition-point of wood.

I have discovered by experimentation that sulfate of ammonium in combination with dihydrogen sodium phosphate, as hereinbefore described, is most effective and desirable; but the similar use of any other chemical having an equivalent action on dihydrogen sodium phosphate and which as a result of the extraction from the combination of part of the sodium base produces a salt which under the conditions described will be possessed of free fluidity at a temperature below the ignition-point of wood and not readily volatilizable would be within the scope of my invention.

I do not desire to restrict myself to the use of the precise chemicals or proportions hereinbefore stated; but

What I claim, and desire to secure by Letters Patent, is—

1. A fireproofing compound containing dihydrogen sodium phosphate.

2. A fireproofing compound containing dihydrogen sodium ortho phosphate.

3. A fireproofing compound containing dihydrogen sodium phosphate and sulfate of ammonium in such proportions that the resulting compound is freely fluid at a temperature below the point of wood ignition.

4. A fireproofing compound containing dihydrogen sodium ortho phosphate and sulfate of ammonium in such proportions that the resulting compound is freely fluid at a temperature below the point of wood ignition.

In witness whereof I have hereunto signed my name in the presence of two subscribing witnesses.

WILLIAM D. PATTEN.

Witnesses:
JOHN S. HOWELL,
SEABURY C. MASTICK.